US009844812B2

(12) United States Patent
Rickenbacher et al.

(10) Patent No.: US 9,844,812 B2
(45) Date of Patent: Dec. 19, 2017

(54) PROCESS FOR THE PRODUCTION OF ARTICLES MADE OF A GAMMA-PRIME PRECIPITATION-STRENGTHENED NICKEL-BASE SUPERALLOY BY SELECTIVE LASER MELTING (SLM)

(71) Applicant: ALSTOM Technology Ltd, Baden (CH)

(72) Inventors: Lukas Emanuel Rickenbacher, Basel (CH); Adriaan Bernardus Spierings, Wittenbach (CH)

(73) Assignee: ANSALDO ENERGIA IP UK LIMITED, London (GB)

( * ) Notice: Subject to any disclaimer, the term of this patent is extended or adjusted under 35 U.S.C. 154(b) by 880 days.

(21) Appl. No.: 13/667,172

(22) Filed: Nov. 2, 2012

(65) Prior Publication Data
US 2013/0228302 A1    Sep. 5, 2013

(30) Foreign Application Priority Data

Nov. 4, 2011    (CH) ........................................ 1776/11

(51) Int. Cl.
*B23K 26/32*    (2014.01)
*B22F 3/00*    (2006.01)
(Continued)

(52) U.S. Cl.
CPC ............ *B22F 3/008* (2013.01); *B22F 3/1055* (2013.01); *B22F 3/15* (2013.01); *B22F 9/082* (2013.01);
(Continued)

(58) Field of Classification Search
CPC ............... B22F 3/1055; B22F 2999/00; B22F 2003/248; B22F 3/15; B22F 3/008;
(Continued)

(56) References Cited

U.S. PATENT DOCUMENTS 4,212,900 A * 7/1980 Serlin ........................... 148/241
4,336,312 A * 6/1982 Clark et al. .................. 428/680
(Continued)

FOREIGN PATENT DOCUMENTS

CN    1135731 A    11/1996
CN    2761319 Y    3/2006
(Continued)

OTHER PUBLICATIONS

Carter et al.,"Laser Powder Bed Fabrication of Nickel—Base Superalloy", 12th International Symposium on Superalloys. University of Buckingham, The Minerals, Metals, and Materials Society. 2012.*
(Continued)

*Primary Examiner* — Dana Ross
*Assistant Examiner* — Lawrence Samuels
(74) *Attorney, Agent, or Firm* — Buchanan Ingersoll & Rooney PC

(57) ABSTRACT

A process for producing a crack-free and dense three-dimensional article of a gamma-prime precipitation-strengthened nickel-base superalloy, with more than 6 wt. % of [2 Al (wt. %)+Ti (wt. %)], which involves: (a) preparing a powder layer of a gamma-prime precipitation-strengthened nickel-based alloy material, with uniform thickness on a SLM apparatus substrate plate, or on a previously processed powder layer; (b) melting the prepared powder layer by scanning with a focused laser beam an article cross section area according to a three-dimensional sliced model with calculated cross sections, stored in the SLM control unit; (c) lowering the substrate plate by one layer thickness; and (d) repeating (a) to (c) until reaching a final cross section according to the three-dimensional sliced model, wherein, for (b), the laser power, focus diameter of the focal spot, and
(Continued)

scan speed of the focused laser beam are adjusted to obtain heat dissipation welding.

18 Claims, 3 Drawing Sheets

(51) Int. Cl.
| | |
|---|---|
| B22F 3/105 | (2006.01) |
| C22C 19/05 | (2006.01) |
| B22F 3/15 | (2006.01) |
| B22F 9/08 | (2006.01) |
| C22C 1/04 | (2006.01) |
| B33Y 10/00 | (2015.01) |
| B33Y 40/00 | (2015.01) |
| B22F 3/24 | (2006.01) |

(52) U.S. Cl.
CPC .......... *C22C 1/0433* (2013.01); *C22C 19/056* (2013.01); *B22F 2003/1056* (2013.01); *B22F 2003/1057* (2013.01); *B22F 2003/248* (2013.01); *B22F 2999/00* (2013.01); *B33Y 10/00* (2014.12); *B33Y 40/00* (2014.12); *Y02P 10/295* (2015.11)

(58) Field of Classification Search
CPC .............. B22F 9/082; B22F 2003/1057; B22F 2003/1056; B23K 26/345; B23K 2201/001; B23K 26/3213; B23K 35/3033; C22C 19/056; C22C 1/0433; Y02P 10/295; B33Y 10/00; B33Y 30/00; B33Y 50/02
USPC .............. 219/121.6, 121.65, 121.66, 121.82, 219/121.85
See application file for complete search history.

(56) References Cited

U.S. PATENT DOCUMENTS

| | | | | |
|---|---|---|---|---|
| 4,750,947 A * | 6/1988 | Yoshiwara et al. | ............ | 148/512 |
| 4,762,553 A * | 8/1988 | Savage et al. | .................. | 75/336 |
| 4,851,188 A * | 7/1989 | Schaefer et al. | .................. | 419/9 |
| 5,053,090 A * | 10/1991 | Beaman | .................. | B22F 3/004 |
| | | | | 156/272.8 |
| 5,106,010 A * | 4/1992 | Stueber et al. | ................ | 228/232 |
| 5,182,170 A * | 1/1993 | Marcus | .................. | B22F 3/004 |
| | | | | 156/272.8 |
| 5,312,056 A * | 5/1994 | Kastingschafer | .... | B23K 35/308 |
| | | | | 241/235 |
| 5,554,837 A * | 9/1996 | Goodwater et al. | ...... | 219/121.63 |
| 5,817,206 A * | 10/1998 | McAlea | .................. | C08J 3/122 |
| | | | | 156/272.8 |
| 5,914,059 A * | 6/1999 | Marcin, Jr. | ............. | B23P 6/007 |
| | | | | 148/525 |
| 5,961,861 A * | 10/1999 | McCay | ................ | B23K 26/032 |
| | | | | 219/121.63 |
| 5,980,812 A * | 11/1999 | Lawton | ................ | B22F 1/0003 |
| | | | | 264/308 |
| 6,046,426 A * | 4/2000 | Jeantette | ............. | B01F 13/0255 |
| | | | | 219/121.63 |
| 6,054,672 A * | 4/2000 | Foster et al. | ............. | 219/121.66 |
| 6,127,644 A * | 10/2000 | Singh | .................... | B23K 9/048 |
| | | | | 219/73.11 |
| 6,215,093 B1 * | 4/2001 | Meiners et al. | ......... | 219/121.61 |
| 6,383,248 B1 * | 5/2002 | Taylor | .................... | B22F 5/10 |
| | | | | 419/28 |
| 6,495,793 B2 * | 12/2002 | Tewari | .................. | B23K 26/34 |
| | | | | 148/525 |
| 6,621,039 B2 | 9/2003 | Wang et al. | | |
| 6,861,613 B1 * | 3/2005 | Meiners et al. | ......... | 219/121.65 |
| 6,872,912 B1 * | 3/2005 | Wos et al. | ................ | 219/121.64 |
| 7,009,137 B2 * | 3/2006 | Guo | ......................... | 219/121.64 |
| 8,618,434 B2 * | 12/2013 | Chen | ....................... | C22C 19/00 |
| | | | | 219/76.14 |
| 9,035,213 B2 * | 5/2015 | Arjakine | ................ | B05B 7/228 |
| | | | | 148/521 |
| 9,352,421 B2 * | 5/2016 | Illston | ................. | B29C 67/0077 |
| 2002/0148817 A1 * | 10/2002 | Tewari | ................... | B23K 26/34 |
| | | | | 219/121.64 |
| 2002/0152002 A1 * | 10/2002 | Lindemann et al. | ........ | 700/119 |
| 2002/0170891 A1 * | 11/2002 | Boyle et al. | ............ | 219/121.67 |
| 2004/0056022 A1 | 3/2004 | Meiners et al. | | |
| 2005/0067466 A1 * | 3/2005 | Boegli | ..................... | B23K 9/04 |
| | | | | 228/119 |
| 2006/0157454 A1 * | 7/2006 | Larsson | ..................... | 219/121.8 |
| 2006/0228248 A1 * | 10/2006 | Larsson | .......................... | 419/6 |
| 2007/0035069 A1 * | 2/2007 | Wust et al. | ................... | 264/497 |
| 2008/0182017 A1 * | 7/2008 | Singh | .................... | B22F 3/1055 |
| | | | | 427/142 |
| 2008/0210347 A1 * | 9/2008 | Morin et al. | .................. | 148/527 |
| 2008/0237301 A1 * | 10/2008 | Hirano | .................... | B21C 37/02 |
| | | | | 228/56.3 |
| 2008/0304975 A1 * | 12/2008 | Clark | ........................ | B22F 7/04 |
| | | | | 416/241 R |
| 2009/0183850 A1 * | 7/2009 | Morrison | ................ | B22F 5/009 |
| | | | | 164/91 |
| 2009/0220814 A1 * | 9/2009 | Nishiyama | ................ | B22F 3/18 |
| | | | | 428/554 |
| 2009/0255981 A1 * | 10/2009 | Singer | .................. | B23K 1/0018 |
| | | | | 228/119 |
| 2009/0277540 A1 * | 11/2009 | Langlet | ........................ | 148/522 |
| 2009/0285715 A1 * | 11/2009 | Arjakine | ............ | B23K 35/0261 |
| | | | | 420/450 |
| 2010/0000976 A1 * | 1/2010 | Ott | ........................ | B23K 1/0018 |
| | | | | 219/121.17 |
| 2011/0016717 A1 * | 1/2011 | Morrison et al. | ........... | 29/889.72 |
| 2011/0062220 A1 * | 3/2011 | Feng | .................. | B23K 35/3033 |
| | | | | 228/119 |
| 2011/0073636 A1 * | 3/2011 | Arjakine | ................ | F01D 5/005 |
| | | | | 228/102 |
| 2011/0089150 A1 * | 4/2011 | Arjakine | ................ | B23K 26/32 |
| | | | | 219/121.64 |
| 2011/0106290 A1 * | 5/2011 | Hovel et al. | .................. | 700/120 |
| 2011/0114606 A1 * | 5/2011 | Suzuki | ............... | B23K 35/0266 |
| | | | | 219/74 |
| 2011/0226390 A1 * | 9/2011 | Chen | ........................ | C22C 19/00 |
| | | | | 148/527 |
| 2012/0100030 A1 * | 4/2012 | Green | .................... | B22F 3/1039 |
| | | | | 419/6 |
| 2012/0267347 A1 * | 10/2012 | Arjakine | ................ | B05B 7/228 |
| | | | | 219/121.64 |
| 2012/0298628 A1 * | 11/2012 | Bowers | ................ | B23K 9/0284 |
| | | | | 219/61 |
| 2014/0034626 A1 * | 2/2014 | Illston | ................. | B29C 67/0077 |
| | | | | 219/121.78 |

FOREIGN PATENT DOCUMENTS

| | | |
|---|---|---|
| CN | 1803348 A | 7/2006 |
| CN | 1861296 A | 11/2006 |
| DE | 10 10 4732 C1 | 6/2002 |
| EP | 1466718 A2 | 10/2004 |
| EP | 2246145 A1 | 11/2010 |
| EP | 2 319 641 A1 | 5/2011 |

OTHER PUBLICATIONS

B. Geddes, H. Leon, X. Huang: Superalloys, Alloying and performance, ASM International, Dec. 2010, p. 71-72.

Kelbassa I et al: "Manufacture and repair of aero engine components using laser technology", 3$^{rd}$ Pacific International Conference on Applications of Lasers and Optics, Picalo: Apr. 16-18, 2008, Capital Hotel, Beijing, China; Sessions Featuring: Plenary, Laser Materials Processing Conference, Micro, Nano & Ultrafast Fabrication C, Jan. 1, 2008 (Jan. 1, 2008), p. 208-213, XP009161890.

Sehrt J Ed—Jan T Sehrt: "Entwicklung einer Verfahrensstematik bei der Qualifizierung neuer Werkstoffe fuer das Strahlschmelzen", Jan.

(56) References Cited

OTHER PUBLICATIONS 1, 2010 (Jan. 1, 2010), Moeglichkeiten und Grenzen bei der Generativen Herstellung Metallischer Bauteile durch das Strahlschmelzverfahren, Aachen: Shaker, pp. 15-25, XP009161886.
Osakada et al: "Flexible manufacturing of metallic products by selective laser melting of powder", International Journal of Machine Tool Design and Research, Pergamom Press, Oxford, GB, vol. 46, No. 11, Sep. 1, 2006 (Sep. 1, 2006), pp. 1188-1193, XP005572810.
Yadroitsev I et al: "Manufacturing of fine-structured 3D porous filter elements by selective laser melting", Applied Surface Science, Elsevier, Amsterdam, NL, vol. 255, No. 10, Mar. 1, 2009 (Mar. 1, 2009), pp. 5523-5527, XP026001168.
Kamran Mumtaz et al: "Top surface and side roughness of Inconel 625 parts processed using selective laser melting", Rapid Prototyping Journal, MCB University Press, Bradford, GB, vol. 15, No. 2, Jan. 1, 2009 (Jan. 1, 2009), pp. 96-103, XP009161885.
L. Lue, J. Fuh, Y.-S, Wong: "Laser-induced materials and processes for rapid prototyping", Dec. 31, 2001 (Dec. 31, 2001), Kluwer Academic Publishers, USA, XP002681741, pp. 143-153.
Mumtaz., K. and N. Hopkinson, Laser melting functionally graded composition of Waspaloy® and Zirconia powders. Journal of Materials Science, Dec. 2007. 42(18): p. 7647-7656.
Mumtaz, K.A., P. Erasenthiran, and N. Hopkinson, High density selective laser melting of Waspaloy®. Journal of Materials Processing Technology, Dec. 2008. 195(1-3): p. 77-87.
European Patent Office, Search Report in Swiss Patent Application No. 1776/2011 dated (Aug. 20, 2012).
Office Action dated Jun. 20, 2014, by the Chinese Patent Office in corresponding Chinese Patent Application No. 201210435168.6 and an English Translation of the Office Action. (18 pages).

\* cited by examiner

US 9,844,812 B2

PROCESS FOR THE PRODUCTION OF ARTICLES MADE OF A GAMMA-PRIME PRECIPITATION-STRENGTHENED NICKEL-BASE SUPERALLOY BY SELECTIVE LASER MELTING (SLM)

CROSS-REFERENCE TO RELATED APPLICATIONS

Priority is claimed to Swiss Patent Application No. 01776/11, filed on Nov. 4, 2011, the entire disclosure of which is incorporated herein by reference.

FIELD

The present application relates to the technology of producing three-dimensional articles by means of selective laser melting (SLM). It refers to a process for the production of crack-free and dense three-dimensional articles made of a gamma-prime precipitation-strengthened nickel-base superalloy by selective laser melting (SLM).

BACKGROUND

Gamma-prime (γ') precipitation-strengthened nickel-base superalloys with a combined fraction of Al and Ti of about more than 5 wt.-% are known to be very difficult to weld because of their micro-crack sensitiveness.

In the document: B. Geddes, H. Leon, X. Huang: Superalloys, Alloying and performance, ASM International, 2010, page 71-72, the authors describe a weldability line for superalloys approximately as [two times Al concentration (wt.-%)+Ti concentration (wt. %)]<6.0, this means that Ni base superalloys with more than 6 wt.-% of [2 Al (wt.-%)+Ti (wt.-%)] are defined as difficult to weld materials. Solidification and grain boundary liquation cracking occurs during the welding process, whereas post-weld heat treatments often lead to strain age cracking in gamma-prime $Ni_3(Al,Ti)$ precipitate strengthened alloys. Therefore, mainly solid-solution strengthened (e.g. IN625) or gamma-prime strengthened nickel-base superalloys with a low amount of Al and Ti (e.g. In718) can be processed by SLM up to the present day.

In a common approach to process difficult to weld gamma-prime precipitation-strengthened nickel-base superalloys, a powder bed is heated to an elevated temperature to reduce residual stresses resulting from the welding process. But, before the finished parts can be removed from the powder bed, it has to be cooled down to ambient temperature. Due to the low heat conductivity of powder beds, the heating up and cooling down of the powder bed requires a lot of time resulting in a significant decrease in productivity of the SLM process. Furthermore expensive heating equipment and isolation as well as adaptation of the process chamber are needed.

The following literature is related to these technologies and problems:

(1) Kelbassa, I., et al. Manufacture and repair of aero engine components using laser technology. in Proceedings of the 3rd Pacific International Conference on Application of Lasers and Optics. 2008;
(2) Mumtaz, K. and N. Hopkinson, Top surface and side roughness of Inconel 625 parts processed using selective laser melting. Rapid Prototyping Journal, 2009. 15(2): p. 96-103;
(3) Mumtaz, K. and N. Hopkinson, Laser melting functionally graded composition of Waspaloy® and Zirconia powders. Journal of Materials Science, 2007. 42(18): p. 7647-7656;
(4) Mumtaz, K. A., P. Erasenthiran, and N. Hopkinson, High density selective laser melting of Waspaloy®. Journal of Materials Processing Technology, 2008. 195(1-3): p. 77-87; and
(5) Sehrt, J. T. and G. Witt, Entwicklung einer Verfahrenssystematik bei der Qualifizierung neuer Werkstoffe für das Strahlschmelzverfahren. 2010. Publication of trials to process difficult to weld gamma-prime precipitation-strengthened ni-base superalloys.

Furthermore, document U.S. Pat. No. 6,215,093 B1 discloses a method for manufacturing a moulded body, in accordance with three-dimensional CAD data of a model of a moulded body, by depositing layers of a metallic material in powder form. Several layers of powder are successively deposited one on top of the other, whereby each layer of powder is heated to a specific temperature by means of a focused laser beam applied to a given area corresponding to a selected cross-sectional area of the model of the moulded body, before deposition of the next layer. The laser beam is guided over each layer of powder in accordance with the CAD cross-sectional data of the selected cross-sectional area of the model in such a way that each layer of powder is fixed to the layer below it. Especially, the metallic material in powder form is applied in the form of a metallic powder free of binders and fluxing agents, that it is heated by the laser beam to melting temperature, that the energy of the laser beam is chosen in such a way that the layer of metallic powder is fully molten throughout at the point of impact of said laser beam, that the laser beam is guided across the specified area of powder in several runs in such a way that each run of the laser beam partly overlaps the preceding run, and that a protective gas atmosphere is maintained above the interaction zone of the laser beam and the metallic powder.

Document DE 10 10 4732 C1 teaches a device for selective laser melting of metallic materials comprising a heating plate arranged on a platform with side walls. The heating plate is structured so that an insulating layer is thermally insulated from the platform so that temperatures of 500 deg C. can be achieved during the operation. Preferably, the heating plate is formed as a substrate plate and has integrated heating wires. An induction unit is provided for inductively heating the heating plate.

Document U.S. Pat. No. 6,621,039 B2 discloses a computer-controlled apparatus and method for producing metallic parts by laser melting selected regions of layers of metal powder at a target area. The system includes devices for preheating and maintaining a relatively high temperature, e.g. 400° C., of the metal powder so as to join the metal powder together with relatively low laser power, e.g. a 200 W CO2 laser. The metal powder is preheated at either a dispensing cylinder or the target area through thermal conduction and/or is also heated by a heating plate positioned above the platform through radiation.

SUMMARY

It is an object of the present application to provide a process for the production of crack-free and dense three-dimensional articles made of a gamma-prime precipitation-strengthened nickel-base superalloy by selective laser melting (SLM).

According to an embodiment of the invention a process for the production of crack-free and dense three-dimensional articles made of a gamma-prime precipitation-strengthened nickel-base superalloy, comprising more than 6 wt.-% of [2 Al (wt.-%)+Ti (wt.-%)], by selective laser melting (SLM) comprises the steps of:

a) providing an SLM apparatus with an SLM control unit;
b) providing a three-dimensional sliced model of said article with calculated cross sections, which is passed to and stored in said SLM control unit;
c) preparing powder of said gamma-prime precipitation-strengthened nickel-base alloy material, which is needed for said SLM process;
d) preparing a powder layer with a regular and uniform thickness on a substrate plate of said SLM apparatus or on a previously processed powder layer;
e) melting said prepared powder layer by scanning with a focused laser beam an area corresponding to a cross section of said article according to the three-dimensional sliced model stored in said control unit;
f) lowering the substrate plate by one layer thickness;
g) repeating steps from d) to f) until reaching the last cross section according to the three-dimensional sliced model;

wherein for said melting step e) the laser power, focus diameter of the focal spot and scan speed of said focused laser beam are adjusted to obtain heat dissipation welding.

BRIEF DESCRIPTION OF THE DRAWINGS

Aspects of the present invention are now to be explained more closely by means of different embodiments and with reference to the attached drawings.

DETAILED DESCRIPTION

Figure 1:
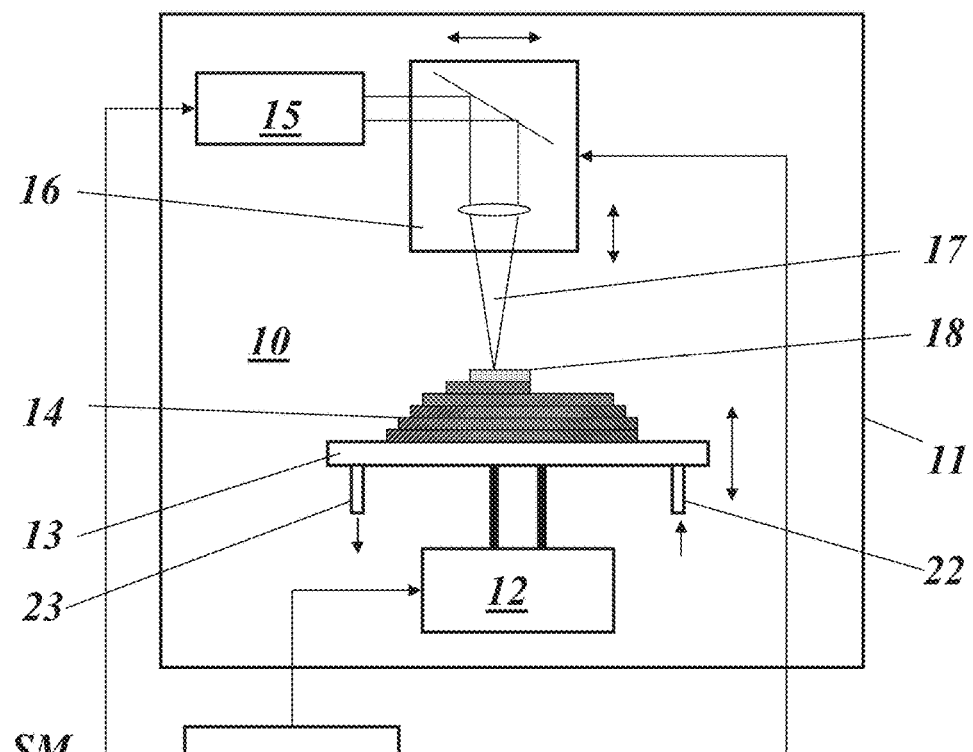
FIG. 1 shows a schematic diagram of an SLM apparatus for conducting the process of the invention.

According to an embodiment of the invention for said melting step e) a laser source in pulsed mode is used and the pulse frequency is adjusted to obtain heat dissipation welding.

According to another embodiment of the invention the laser power, focus diameter of the focal spot, scan speed and, if applicable, the pulse frequency of said focused laser beam are adjusted such that said heat dissipation welding results in a weld bead aspect ratio of depth to width smaller 0.5, preferably between 0.3 and 0.1.

According to a further embodiment of the invention said adjustment of said focus diameter is done by using a specific focusing equipment.

According to another embodiment of the invention said adjustment of said focus diameter is done by displacing said substrate plate.

A further embodiment is characterized in that the particle size distribution of the powder is adjusted with respect to the thickness of the powder layer, such that it leads to a good flowability and a bulk density >60% necessary for preparing powder layers with regular and uniform thickness and to reduce shrinkage effects. Especially, the exact particle size distribution is obtained by sieving and/or winnowing (air separation).

According to another embodiment of the invention the powder is obtained by gas atomization or plasma-rotating-electrode process.

A further embodiment of the invention is characterized in that said gamma-prime precipitation-strengthened nickel-base superalloy consists of 3.2-4.2 wt.-% Al
2.8-3.8 wt.-% Ti
14.5-17 wt.-% Cr
7.8-9.0 wt.-% Co
1.2-1.9 wt.-% Mo
2.1-3.5 wt.-% W
1.0-2.0 wt.-% Ta
0.5-1.5 wt.-% Nb
<0.15 wt.-% C
<0.02 wt.-% B
remainder Ni and unavoidable impurities.

According to a just another embodiment of the invention said steps d) to g) are performed in a protective gas atmosphere.

Preferably, said protective gas atmosphere comprises nitrogen or argon, or another suitable gas to establish a reducing atmosphere.

According to another embodiment of the invention said substrate plate is cooled to conduct away process heat and thereby reducing time required for solidification of the weld bead.

According to another embodiment of the invention prior to said melting step e) a pre-melting step is performed to loosely melt or pre-sinter the powder of said powder layer together and said melting step e) will afterwards densify the powder layer to obtain a dense three-dimensional article.

Another embodiment of the invention is characterized in that a post heat treatment is applied to said article to further optimize the microstructure after the three-dimensional article is build up.

Especially, said heat treatment is hot isostatic pressing (HIP).

To overcome the restrictions described above the SLM process parameters are adjusted with regard to the unique material behavior of the gamma-prime precipitation-strengthened superalloys allowing the manufacturing of crack-free and dense three-dimensional articles by selective laser melting without heating up the powder bed or the part to build. Furthermore, it was found, that the use of specific process equipment further improves the processability of these materials.

The present invention disclosure relates to specially adjusted process parameters and process equipment for producing three-dimensional articles made of gamma-prime precipitation-strengthened nickel-base superalloys with a combined fraction of [2Al+Ti] of more than 6 wt.-% using selective laser melting technology (SLM). These superalloys are strengthened through controlled heat treatment producing $Ni_3$(Al, Ti) precipitates, known as gamma-prime ($\gamma'$), or $Ni_3Nb$, known as gamma-double-prime ($\gamma''$). These precipitations lead to superior creep, stress-rupture and tensile strength compared to earlier generation of nickel-based alloys.

The invention provides process parameters and describes suitable process equipment for selective laser melting of gamma-prime precipitation-strengthened superalloys which contain titanium and aluminum in a combined amount of at least about 5 wt.-%, preferably 6-12 wt.-%, and containing chromium in an amount up to about 20 wt.-%, preferably 7-17 wt-%, resulting in a gamma-prime content of at least about 25%.

These superalloys also may contain metals such as tungsten, molybdenum, cobalt and tantalum and may contain other elements such as carbon, boron, zirconium and hafnium. Typical examples of theses gamma-prime precipitation strengthened nickel base superalloys are: Mar-M247, IN100, IN738, IN792, Mar-M200, B1900, RENE 80, Alloy 713 and other derivatives.

The precipitation hardening phenomena and the associated volumetric changes facilitates cracking and makes welding of these superalloys very difficult. In particular upon welding, a portion of the previously processed layers (heat affected zone HAZ) is heated into the precipitation hardening temperature range and undergoes a volumetric contraction resulting in residual stress in the weldment upon solidification, accompanied by a loss in ductility. Rapid heat-up and cool-down from welding temperatures, which are characteristic for the SLM process, produces complicated thermal expansion and contraction, leading to additional residual stress. These thermal stresses, when combined with previous stresses resulting from the precipitation, can result in cracking during the welding process.

The cracking occurs either in the weld bead itself (solidification cracking) or within the HAZ due to localized melting at grain boundaries (grain boundary liquation cracking). Post weld solution annealing and/or aging heat treatments resulting in volumetric contraction can further increase susceptibility to cracking (strain age cracking). The difficulty in welding generally increases with increasing aluminum and titanium content.

It has been found, that the SLM process results in a very homogenous microstructure with few segregations and small grains. This is beneficial regarding grain boundary liquation cracking, since the cracking sensitiveness increases with increasing grain size and increased content of segregations. Furthermore it has been found, that only a very small gamma-prime content exists after the SLM process, due to the characteristic high thermal gradients occurring at laser-material interactions preventing the diffusion controlled precipitation of intermetallic phases. Therefore strain-age cracking during build up by SLM can be neglected and as a consequence mainly solidification cracking is of concern for the SLM process.

A wide solidification range of the alloy, segregation of low melting impurities at the weld bead centerline as well as residual stresses are the main causes of solidification cracking. To minimize the influence of segregations a high solidification rate and therefore high temperature gradients are beneficial. This can be best achieved by adjusting the SLM parameters resulting in a weld bead with a low depth-to-width-ratio. But high temperature gradients leads to high residual stress and therefore an optimum weld bead geometry has to be found, whereas the depth to width ratio should be as low as possible allowing the manufacturing of crack-free and dense articles by SLM.

According to an aspect of the present invention, the process comprises:
a) providing an SLM apparatus (10) with an SLM control unit (19);
b) providing a three-dimensional sliced model (SM) of said article with calculated cross sections, which is passed to and stored in said SLM control unit (19);
c) preparing powder of said gamma-prime precipitation-strengthened nickel-base alloy material, which is needed for said SLM process;
d) preparing a powder layer (18) with a regular and uniform thickness on a substrate plate (13) of said SLM apparatus (10) or on a previously processed powder layer (14);
e) melting said prepared powder layer (18) by scanning with a focused laser beam (17) an area corresponding to a cross section of said article according to the three-dimensional sliced model (SM) stored in said control unit (19);
f) lowering the substrate plate (13) by one layer thickness;
g) repeating steps from d) to f) until reaching the last cross section according to the three-dimensional sliced model (SM);
wherein for said melting step e) the laser power, focus diameter (d) of the focal spot (20) and scan speed of said focused laser beam (17) are adjusted to obtain heat dissipation welding.

FIG. 1 shows a schematic diagram of an SLM apparatus for conducting a process of the invention. The SLM apparatus 10 of FIG. 1 comprises a closed compartment 11, which can be filled with a protective gas atmosphere, for example nitrogen or argon. Within the compartment 11 a substrate plate displacement unit 12 is arranged, which is able to displace in vertical direction a horizontal substrate plate 13. The substrate plate displacement unit 12 is controlled by a central control unit 19.

The substrate plate 13 is used to build up a three-dimensional article by means of successive melting of various powder layers 14, 18 over a predetermined area in accordance with a sliced model SM, which is generated from the article to be produced and stored in the control unit 19. The substrate plate 13 can be cooled by a cooling medium which is introduced through a cooling medium inlet 22 and leaves the substrate plate 13 through a cooling medium outlet 23.

The uppermost powder layer 18 is melted by means of a focused laser beam 17, which is emanating from a laser source 15 and focused and displaced by means of laser beam focusing and displacement unit 16. The laser source 15 and the laser beam focusing and displacement unit 16 are controlled by the central control unit 19.

Figure 6:
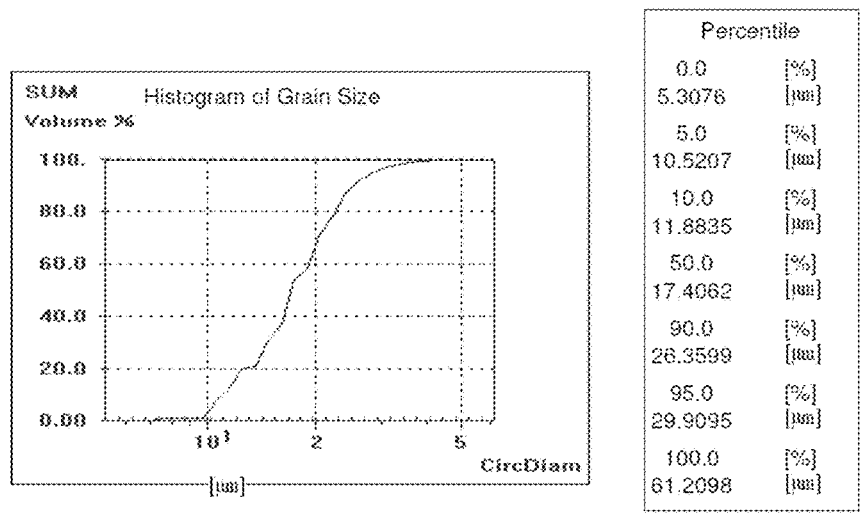
FIG. 6 shows a possible particle size distribution of a powder with good flowability and bulk density.

First of all, the particle size distribution of the powder to be used is adjusted to the layer thickness of the powder layers 14, 18, such that it leads to a good flowability and high bulk density (preferably >60%), which is required for preparing powder layers with regular and uniform thickness and to reduce shrinking effects. Preferably, the powder particles have ably a spherical shape. The exact particle size distribution is obtained by sieving and/or winnowing (i.e. air separation). It is advantageous to obtain the powder by gas atomization or plasma-rotating-electrode process. FIG. 6 shows a possible and exemplary particle size distribution of a powder with good flowability and bulk density for the process of the present application.

As the laser source 15 for the melting step a laser in continuous-wave or pulsed mode is used. For said melting step the laser power, pulse frequency, focus diameter, scan speed, scan vector length, hatch distance and scan island overlap are adjusted with respect to the specific gamma-prime precipitation-strengthened material to allow manufacturing of crack-free and dense three-dimensional articles. Preferably, said laser source has a low intensity or low beam parameter product (BPP).

Figure 2:
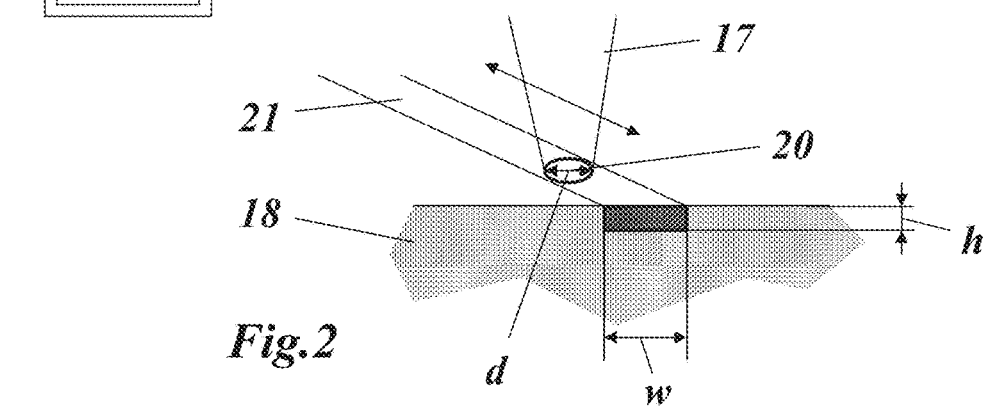
FIG. 2 shows, in the detailed view, the parameters of the laser beam used in the process according to the invention.

Especially, the laser power, pulse frequency, focus diameter (d in FIG. 2) and scan speed are adjusted to obtain heat dissipation welding. Said heat dissipation welding preferably results in a aspect ratio (depth h/width w) of the weld bead 21 smaller 0.5, preferably between 0.3 and 0.1 (see FIG. 2). Said focus diameter adjustment of the focal spot 20 can be done by using the laser focusing and displacement unit 16 or by displacing the powder layer from the focal plane with the substrate plate displacement unit 12.

Figure 3:
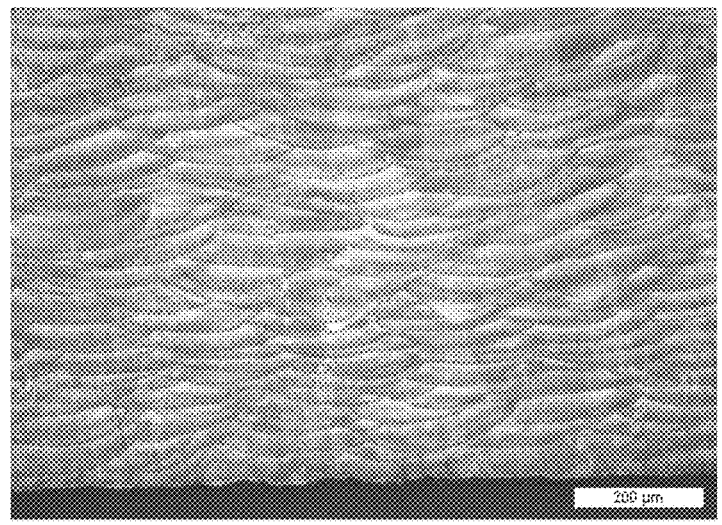
FIG. 3 shows an example of a microstructure free of cracks as a result of a process according to the invention with clearly visible welding beads of suitable cross section or depth to width ratio, respectively.
Figure 4:
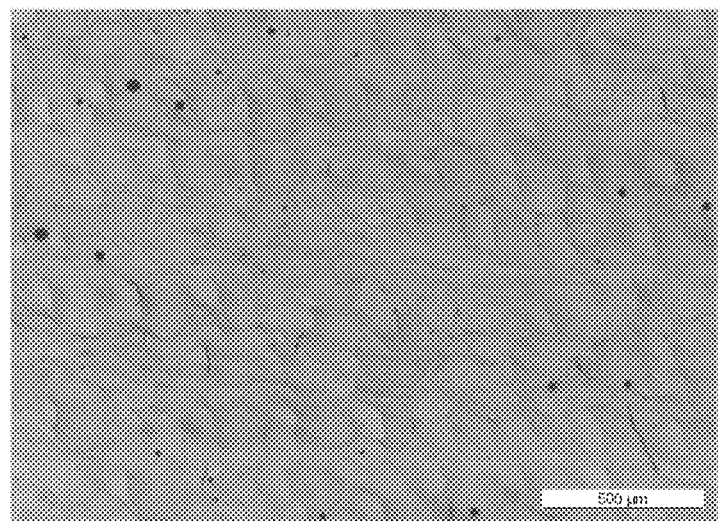
FIGS. 4, 5 show in comparison to FIG. 3 welding beads with an unfavorable cross section ratio, which leads to a microstructure with solidification cracks.
Figure 5:
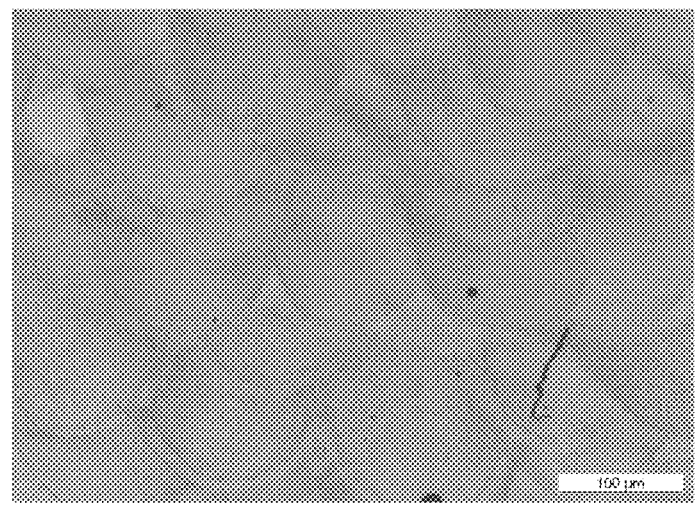

An advantageous welding bead geometry can be achieved by using the following exemplary process parameters:
Laser power: 50-150 W
Laser mode: continuous wave (cw)
Scan velocity: 80-700 mm/s
Hatch distance: 0.01-0.5 mm
Focus diameter: 0.1-0.5 mm FIG. 3 shows an example of a microstructure free of cracks as a result of a process according to the invention with clearly visible welding beads of suitable cross section or depth to width ratio, respectively, while FIGS. 4 and 5 show in comparison to FIG. 3 examples of welding beads with an unfavorable cross section ratio, which leads to a microstructure with solidification cracks.

It is advantageous to perform prior to said melting step a pre-melting step to loosely melt or pre-sinter the powder of the powder layer 18 together, and said melting step will afterwards densify the powder layer to obtain a dense three-dimensional article.

The process steps are d) to g) are preferably performed in a protective gas atmosphere within the compartment 11. A contingent of said protective gas consists of hydrogen or other suitable gases, to thereby generate a reducing atmosphere.

Preferably, said substrate plate 13 is cooled to conduct away process heat and thereby reducing time required for solidification of the weld bead 21.

The process can be improved when a post heat treatment is applied to further optimize the microstructure after the three-dimensional article is build up. Especially, such heat treatment is hot isostatic pressing (HIP). Accordingly, the process parameters for hot isostatic pressing, such as temperature, pressure, holding time, heating and cooling rates, are adjusted to the specific gamma-prime precipitation-strengthened material.

As an example, a gamma-prime precipitation-strengthened nickel-base superalloy to be processed, comprises 3.2-4.2 wt.-% Al; 2.8-3.8 wt.-% Ti; 14.5-17 wt.-% Cr; 7.8-9.0 wt.-% Co; 1.2-1.9 wt.-% Mo; 2.1-3.5 wt.-% W; 1.0-2.0 wt.-% Ta; 0.5-1.5 wt.-% Nb; <0.15 wt.-% C; <0.02 wt.-% B; remainder Ni and unavoidable impurities.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the attached claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

LIST OF REFERENCE NUMERALS

10 SLM apparatus
11 compartment
12 substrate plate displacement unit
13 substrate plate
14 processed powder layer
15 laser source
16 laser beam focusing and displacement unit
17 laser beam
18 powder layer (unprocessed)
19 control unit
20 focal spot
21 weld bead
22 cooling medium inlet
23 cooling medium outlet
d focus diameter
h depth
w width
SM sliced model

The invention claimed is:

1. A process for producing a crack-free three-dimensional article by selective laser melting (SLM), the process comprising:
(a) preparing a powder layer, including a powder of a material including a gamma-prime precipitation-strengthened nickel-base alloy, with a regular and uniform thickness on a substrate plate of an SLM apparatus or on a previously processed powder layer;
(b) melting the prepared powder layer by scanning with a focused laser beam an area corresponding to a cross section of the article according to a three-dimensional sliced model of the article, with calculated cross sections, stored in an SLM control unit of an SLM apparatus, the melting performed such that a laser power, focus diameter of the focal spot, and scan speed of the focused laser beam are adjusted to obtain heat dissipation welding resulting in a weld bead aspect ratio of depth to width smaller than 0.5 during the melting of the prepared powder layer, wherein the laser power is 50-150 W, the scan speed is 80-700 mm/s, the focus diameter is 0.1-0.5 mm, and a hatch distance for the laser is 0.01-0.5 mm and a laser operational mode for generating the laser beam is a continuous wave mode;
(c) lowering the substrate plate by one layer thickness;
(d) repeating (a) to (c) until reaching a final cross section according to the three-dimensional sliced model, and
wherein, in (a), the gamma-prime precipitation-strengthened nickel-base alloy comprises more than 6 wt. % of [2 Al (wt. %)+Ti (wt. %)] and wherein the gamma-prime precipitation-strengthened nickel-base alloy comprises Ni, unavoidable impurities, and:
3.2-4.2 wt. % Al,
2.8-3.8 wt. % Ti,
14.5-17 wt. % Cr,
7.8-9.0 wt. % Co,
1.2-1.9 wt. % Mo,
2.1-3.5 wt. % W,
1.0-2.0 wt. % Ta,
0.5-1.5 wt. % Nb, <0.15 wt. % C, and
<0.02 wt. % B.

2. The process of claim 1, wherein, in (b), a laser source-in pulsed mode is used and a pulse frequency thereof is adjusted to obtain heat dissipation welding.

3. The process of claim 1, wherein adjustment of the focus diameter is done with specific focusing equipment.

4. The process of claim 1, wherein adjustment of the focus diameter is done by displacing the substrate plate.

5. The process of claim 1, comprising adjusting a particle size distribution of the powder with respect to the thickness of the powder layer, such that the powder is flowable and has a bulk density >60% for preparing powder layers with regular and uniform thickness and to reduce shrinking effects.

6. The process of claim 5, wherein an exact particle size distribution is obtained by sieving.

7. The process of claim 1, wherein the powder is obtained by gas atomization.

8. The process of claim 1, wherein (a) to (c) are performed in a protective gas atmosphere.

9. The process of claim 8, wherein the protective gas atmosphere comprises nitrogen or argon.

10. The process of claim 1, further comprising:
cooling substrate plate to conduct away process heat and thereby reducing time required for solidification of the weld bead.

11. The process of claim 1, further comprising, prior to the melting (b):
pre-melting the powder to loosely melt or pre-sinter the powder of the powder layer together, whereafter the melting of the prepared powder layer is performed to make the powder layer more dense to obtain a denser three-dimensional article.

12. The process of claim 1, further comprising, after the article has been formed into a three-dimensional article:
applying a post heat treatment to the three-dimensional article to further optimize a microstructure thereof.

13. The process of claim 12, wherein the post heat treatment is hot isostatic pressing (HIP).

14. The process of claim 1, wherein the weld bead aspect ratio of depth to width is between 0.3 and 0.1.

15. The process of claim 5, wherein an exact particle size distribution is obtained by winnowing or air separation.

16. The process of claim 5, wherein an exact particle size distribution is obtained by sieving and winnowing.

17. The process of claim 1, wherein the powder is obtained by a plasma-rotating-electrode process.

18. The process of claim 8, wherein the gamma-prime precipitation-strengthened nickel-base alloy consists of Ni, unavoidable impurities, and:
3.2-4.2 wt. % Al,
2.8-3.8 wt. % Ti,
14.5-17 wt. % Cr,
7.8-9.0 wt. % Co,
1.2-1.9 wt. % Mo,
2.1-3.5 wt. % W,
1.0-2.0 wt. % Ta,
0.5-1.5 wt. % Nb,
<0.15 wt. % C, and
<0.02 wt. % B; and
wherein the protective gas atmosphere comprises a gas suitable to establish a reducing atmosphere.

* * * * *